United States Patent
Rose et al.

(10) Patent No.: US 10,699,014 B2
(45) Date of Patent: Jun. 30, 2020

(54) PREVENTING CONNECTING TO A LOCKED DEVICE

(71) Applicant: LENOVO (Singapore) PTE. LTD., New Tech Park (SG)

(72) Inventors: Amy Leigh Rose, Chapel Hill, NC (US); John Scott Crowe, Durham, NC (US); Gary David Cudak, Wake Forest, NC (US); Jennifer Lee-Baron, Morrisville, NC (US); Nathan J. Peterson, Oxford, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 211 days.

(21) Appl. No.: 15/710,458

(22) Filed: Sep. 20, 2017

(65) Prior Publication Data

US 2019/0089706 A1    Mar. 21, 2019

(51) Int. Cl.
| G06F 21/57 | (2013.01) |
| H04L 29/06 | (2006.01) |
| H04W 48/02 | (2009.01) |
| G06F 21/44 | (2013.01) |
| G06F 21/88 | (2013.01) |
| H04L 12/801 | (2013.01) |

(52) U.S. Cl.
CPC ............ *G06F 21/57* (2013.01); *G06F 21/44* (2013.01); *G06F 21/88* (2013.01); *H04L 63/10* (2013.01); *H04W 48/02* (2013.01); *H04L 47/10* (2013.01)

(58) Field of Classification Search
CPC ..................................................... G06F 21/88
See application file for complete search history.

(56) References Cited

U.S. PATENT DOCUMENTS

| 5,907,681 | A | * | 5/1999 | Bates ...................... | G06F 9/451 |
| | | | | | 709/228 |
| 6,105,136 | A | * | 8/2000 | Cromer .................. | G06F 21/86 |
| | | | | | 709/218 |
| 7,546,639 | B2 | * | 6/2009 | Bantz ..................... | G06F 21/88 |
| | | | | | 726/2 |
| 8,298,295 | B2 | * | 10/2012 | Aissi ..................... | G06F 21/88 |
| | | | | | 726/34 |
| 9,154,901 | B2 | * | 10/2015 | Hernandez ............. | H04W 4/00 |
| 2004/0163005 | A1 | * | 8/2004 | Kardach ................ | G06F 1/3203 |
| | | | | | 713/323 |
| 2006/0272034 | A1 | * | 11/2006 | Bhansali ............... | G06F 21/572 |
| | | | | | 726/34 |
| 2007/0192652 | A1 | * | 8/2007 | Kao ..................... | G06F 11/0709 |
| | | | | | 714/4.2 |

(Continued)

OTHER PUBLICATIONS

Windows USB Power Management—Disabling (or enabling); Rev 1.0 Sep. 26, 2016 (Year: 2016).*

*Primary Examiner* — James R Turchen
(74) *Attorney, Agent, or Firm* — Kunzler Bean & Adamson

(57) ABSTRACT

Apparatuses, methods, systems, and program products are disclosed for preventing connections to a locked device. A method includes detecting, by a processor, that an information handling device is placed in a locked mode. The information handling device includes one or more communication interfaces that enable communication while the information handling device is placed in the locked mode. The method includes preventing connections to the one or more communication interfaces while the information handling device is in the locked mode.

20 Claims, 6 Drawing Sheets

(56) References Cited

U.S. PATENT DOCUMENTS

| | | | | |
|---|---|---|---|---|
| 2008/0244108 A1* | 10/2008 | Abramson | ......... | G06F 13/4291 |
| | | | | 710/16 |
| 2008/0305766 A1* | 12/2008 | Falk | ....... | H04L 63/20 |
| | | | | 455/410 |
| 2009/0100526 A1* | 4/2009 | Lee | ......... | G06F 21/83 |
| | | | | 726/26 |
| 2009/0122149 A1* | 5/2009 | Ishii | ......... | H04N 1/00127 |
| | | | | 348/222.1 |
| 2011/0145927 A1* | 6/2011 | Hubner | ......... | G06F 21/31 |
| | | | | 726/26 |
| 2011/0239049 A1* | 9/2011 | Wang | ......... | G06F 21/606 |
| | | | | 714/36 |
| 2011/0264749 A1* | 10/2011 | Lovell | ......... | H04L 12/14 |
| | | | | 709/206 |
| 2011/0307633 A1* | 12/2011 | Maietta | ......... | G06F 21/554 |
| | | | | 710/18 |
| 2012/0237908 A1* | 9/2012 | Fitzgerald | ......... | G06F 21/88 |
| | | | | 434/236 |
| 2013/0014221 A1* | 1/2013 | Moore | ......... | G06F 21/85 |
| | | | | 726/3 |
| 2013/0078951 A1* | 3/2013 | Mun | ......... | G06F 21/305 |
| | | | | 455/411 |
| 2014/0196142 A1* | 7/2014 | Louboutin | ......... | G06F 21/44 |
| | | | | 726/16 |
| 2015/0079943 A1* | 3/2015 | Williams | ......... | H04W 12/08 |
| | | | | 455/411 |
| 2015/0148007 A1* | 5/2015 | Mitchell | ......... | H04W 12/1206 |
| | | | | 455/411 |
| 2015/0365237 A1* | 12/2015 | Soffer | ......... | G06F 21/85 |
| | | | | 726/20 |
| 2016/0323703 A1* | 11/2016 | Schlaupitz | ......... | H04W 52/0229 |
| 2018/0047235 A1* | 2/2018 | Hyde | ......... | A61B 5/6825 |
| 2018/0220489 A1* | 8/2018 | Lagnado | ......... | H04W 74/0833 |
| 2019/0014086 A1* | 1/2019 | Meyer | ......... | H04L 63/0263 |

* cited by examiner

PREVENTING CONNECTING TO A LOCKED DEVICE

FIELD

The subject matter disclosed herein relates to device security and more particularly relates to preventing connections to a device while it is in a locked mode.

BACKGROUND

Devices may be locked to prevent unauthorized access to the device while it is unattended. Even though a device may be locked, the device may still allow connections via different communication interfaces, may still run services, may still receive and/or send network traffic, or the like, which may compromise the security of the device.

BRIEF SUMMARY

An apparatus for preventing connections to a locked device is disclosed. The apparatus, in one embodiment, includes one or more communication interfaces of an information handling device. The one or more communication interfaces enabling communication while the information handling device is placed in a locked mode. In a further embodiment, the apparatus includes a processor that is operatively coupled to the one or more communication interfaces, and a memory that stores code executable by the processor.

In one embodiment, the memory stores code executable by the processor to detect that the information handling device is placed in a locked mode. In a further embodiment, the memory stores code executable by the processor to prevent connections to the one or more communication interfaces while the information handling device is in the locked mode.

A method, in one embodiment, includes detecting, by a processor, that an information handling device is placed in a locked mode. The information handling device may include one or more communication interfaces that enable communication while the information handling device is placed in the locked mode. In a further embodiment, the method includes preventing connections to the one or more communication interfaces while the information handling device is in the locked mode.

A program product, in one embodiment, includes a computer readable storage medium that stores code executable by a processor. In some embodiments, the executable code includes code to perform detecting that an information handling device is placed in a locked mode. The information handling device may include one or more communication interfaces that enable communication while the information handling device is placed in the locked mode. In a further embodiment, the executable code includes code to perform preventing connections to the one or more communication interfaces while the information handling device is in the locked mode.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
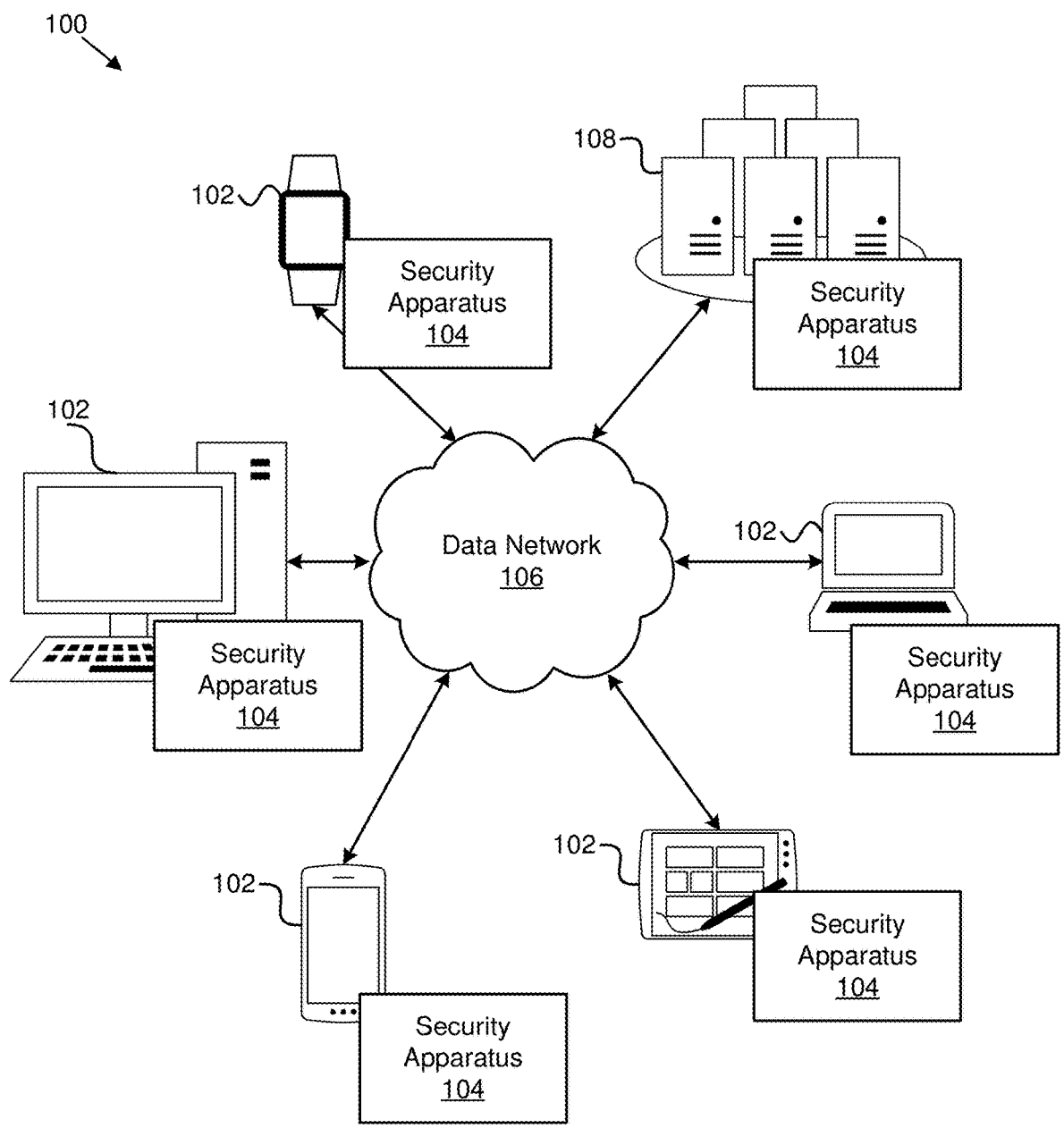
FIG. 1 is a schematic block diagram illustrating one embodiment of a system for preventing connections to a locked device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for preventing connections to a locked device. In one embodiment, the system 100 includes one or more information handling devices 102, one or more security apparatuses 104, one or more data networks 106, and one or more servers 108. In certain embodiments, even though a specific number of information handling devices 102, security apparatuses 104, data networks 106, and servers 108 are depicted in FIG. 1, one of skill in the art will recognize, in light of this disclosure, that any number of information handling devices 102, security apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like.

In one embodiment, the security apparatus 104 is configured to detect that an information handling device 102 is placed in a locked mode, and prevent connections to one or more communication interfaces of the information handling device 102 while it is in the locked mode. The security apparatus 104, including its various sub-modules, may be located on one or more information handling devices 102 in the system 100, one or more servers 108, one or more network devices, and/or the like. The security apparatus 104 is described in more detail below with reference to FIG. 2.

In one embodiment, the security apparatus 104 solves the technical problem of preventing connections to an information handling device 102 from external devices, for example, while a device is in a locked mode. Even though a device may be locked so that unauthorized user cannot access the device without the proper credentials, the communication interfaces on the device may still be functional (e.g., such as plug and play interfaces that facilitate the discovery of a peripheral device in a system without the need for physical device configuration or user intervention) so that external devices may be connected to the communication interfaces and possibly compromise the device by loading malicious code, programs, malware, and/or the like. The subject matter disclosed herein provides a technical solution to preventing unauthorized connections to the device while the device is in a locked mode.

In various embodiments, the security apparatus 104 may be embodied as a hardware appliance that can be installed or deployed on an information handling device 102, on a server 108, or elsewhere on the data network 106. In certain embodiments, the security apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the security apparatus 104 may include a power interface, a wired and/or wireless network interface, a graphical interface that attaches to a display, and/or a semiconductor integrated circuit device as described below, configured to perform the functions described herein with regard to the security apparatus 104.

The security apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the security apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the security apparatus 104.

The semiconductor integrated circuit device or other hardware appliance of the security apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the security apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102, with a user, and/or the like.

Figure 2:
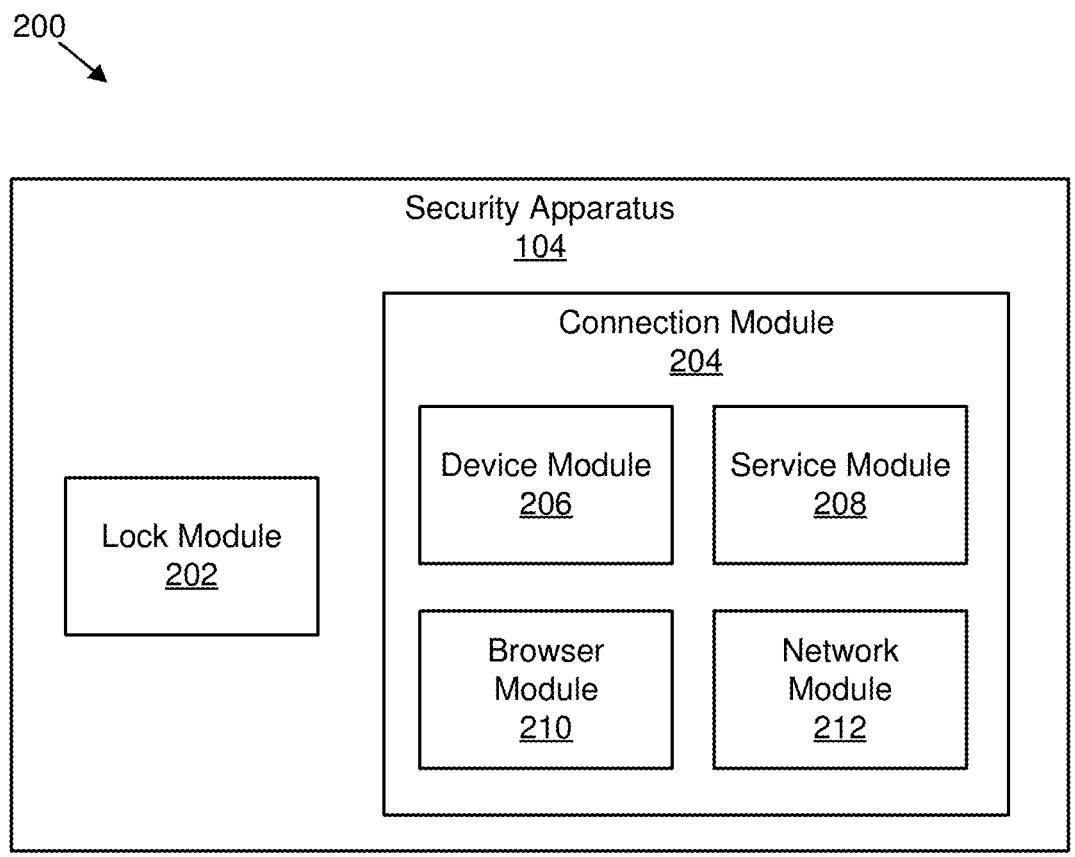
FIG. 2 is a schematic block diagram illustrating one embodiment of an apparatus for preventing connections to a locked device.

FIG. 2 is a schematic block diagram illustrating one embodiment of an apparatus 200 for preventing connections to a locked device. In one embodiment, the apparatus 200 includes an embodiment of a security apparatus 104. The security apparatus 104, in some embodiments, includes one or more of a lock module 202, a connection module 204, which may include a device module 206, a service module 208, a browser module 210, and a network module 212, which are described in more detail below.

The lock module 202, in one embodiment, is configured to detect that an information handling device is placed in a locked mode. As used herein, a locked mode for a device is a mode where the device is secured from unauthorized access. For instance, a mobile device may be placed in a locked mode by turning the display off such that when the display is turned on again, the user may need to enter credentials, biometric information (e.g., fingerprint, facial image), and/or perform some other action to gain access to the mobile device. Similarly, a desktop or laptop computer may be locked such that a user has to provide a username and password, a facial image, a fingerprint, a code, a PIN number, and/or the like to gain access to the computer. Thus, a user may lock a device with the intention of preventing users who are not authorized to access the device from accessing the device.

The locked mode, in certain embodiments, may be managed by an operating system, a basic input/output system ("BIOS"), and/or the like. The lock module 202 may register as a listener or may otherwise be configured to recognize, receive, and/or detect signals, flags, settings, or the like that indicate that a device has been placed in a locked mode.

In certain embodiments, a user may manually place a device in a locked mode. For instance, a user may select a menu item to lock a device, may provide a keyboard shortcut to lock a device, or the like. In such an embodiment, the lock module 202 may detect signals that correspond to the menu item, the keyboard shortcut, or the like that correspond to the lock feature being enabled. In another embodiment, a device may be locked automatically after a predetermined amount of time without any interaction with a user. For example, if the device does not receive any input for five consecutive minutes, the operating system for the device may automatically lock the device. In such an embodiment, the lock module 202 may detect signals that correspond to the lock feature being enabled by the operating system.

The connection module 204, in one embodiment, is configured to prevent connections to one or more communication interfaces of a device while the device is in a locked mode. As used herein, a communication interface may comprise a physical port, connector, and/or the like that serves as an interface between a device and other external or peripheral devices. Examples of physical communication interfaces may include a serial bus connection, a universal serial bus ("USB") connection, an external serial AT attachment ("eSATA") connection, an HDMI connection, an Ethernet connection, an optical drive, a DisplayPort connection, and/or the like. In certain embodiments, a communication interface comprises a wireless interface connection such as a Wi-Fi connection, a Bluetooth® connection, an NFC connection, and/or the like.

In certain embodiments, the connection module 204 includes a device module 206 that is configured to prevent external devices from connecting to a device while it is in the locked mode. In certain embodiments, the device module 206 deactivates, disables, turns off, or the like, one or more communication interfaces of a device in response to the device being placed in the locked mode so that external devices cannot communicate with the device while it is the locked mode.

For example, the device module 206 may disable the USB ports on a laptop computer so that peripheral devices such as external hard drives, USB flash drives, or the like, cannot communicate with the laptop computer, e.g., cannot transmit data back and forth between the peripheral device and the laptop computer, even though the peripheral devices may be physically connected to the laptop computer, while the laptop computer is in the locked mode. The device module 206 may enable/disable communication interfaces via a device manager in an operating system, via BIOS or other system settings, and/or the like.

In one embodiment, the device module 206 keeps existing connections to one or more external devices on the one or more communication interfaces open while the device is in the locked mode. For example, if a USB flash drive is connected to a device via a USB port when the device is placed in the locked mode, the device module 206 may allow the USB flash drive to continue to communicate with the device because it was already connected to the device prior to the device being placed in the locked mode. In other words, the device module 206 may not deactivate or disable the USB port that the USB flash drive is connected to because the device module 206 may assume that the USB flash drive is an authorized device because it was connected to the device before the device was placed in the locked mode.

In one embodiment, the device module 206 tracks, logs, or the like identifying information for peripheral devices that are connected to a device prior to the device being placed in the locked mode. For instance, the device module 206 may track and store device identifiers, such as a unique ID, for each peripheral device that is connected to the device prior to the device being placed in the locked mode. The device module 206 may allow previously connected peripheral devices to connect to the device while the device in the locked mode as long as the peripheral device is identified as a peripheral device that was previously connected to the device.

For example, the device module 206 may determine an identifier for the peripheral device when it is connected to a device that is in the locked mode, and check the identifier against a list of identifiers for previously connected peripheral devices to determine whether the peripheral device has previously been connected to the device. If so, the device module 206 may allow the peripheral device to communicate with the device while it is in locked mode.

In one embodiment, the device module 206 detects that an external device is attempting to connect to a device via a communication interface while the device is in a locked mode. In such an embodiment, the device module 206 may determine a device identifier for the external device and determine whether the identifier is on a predetermined white list of allowed external devices. The white list of allowed external devices may be automatically generated as peripheral devices are connected to the device prior to the device being placed in the locked mode, as in the example above.

The device module 206 may also add peripheral devices to a white list in response to user input. For instance, when a peripheral device is connected to a device, the device module 206 may prompt the user to confirm whether the peripheral device should be added to the white list as a peripheral device that is allowed to communicate with the device while the device is in the locked mode. If the device module 206 identifies the external device on the white list, the device module 206 may allow the external device to communicate with the device via the communication interface while the device is in the locked mode, e.g., the device module 206 may not disable or deactivate the communication interface that the external device is connected to when the device is placed in the locked mode.

In one embodiment, the connection module 204 includes an instance of a service module 208 that is configured to block one or more services executing on a device from accessing one or more communication interfaces of the device while the device is in the locked mode. As used herein, a service may refer to a program that runs as a background process, instead of being under the direct control of a user. For instance, the device may include various programs, applications, or the like, that execute on the device as services in the background for performing various tasks or functions without requiring interaction with a user.

However, if a hacker installs a malicious service on a device when the device is in locked mode, the user may not notice that the service is running, and the hacker may be able to communicate with the service via a communication interface, e.g., a Wi-Fi or other network interface, to control the service, to receive and/or send information to the service, and/or the like. Thus, the service module 208, in one embodiment, prevents new services from running when the device is in the locked mode, prevents running services from accessing communication interfaces when the device is in the locked mode, and/or the like. The service module 208 may access service settings via a service manager in an operating system to enable and/or disable services that are running on the device.

In certain embodiments, the service module 208 allows services that are running when the device is placed in the locked mode to continue accessing the communication interfaces of the device while the device is in the locked mode. The assumption being that because the services were running when the user was using the device, the services are trusted by the user and therefore should be allowed to continue accessing the communication interfaces of the device while the device is in the locked mode.

In one embodiment, the service module 208 detects that a service is attempting to access a communication interface while the device is in a locked mode. In such an embodiment, the service module 208 may determine an identifier for the service and determine whether the identifier is on a predetermined white list of allowed services. The white list of allowed services may be automatically generated as services are executed prior to the device being placed in the locked mode.

The service module 208 may also add services to a white list in response to user input. For instance, when a service is executed on a device, the service module 208 may prompt the user to confirm whether the service should be added to the white list as a service that is allowed to access communication interfaces while the device is in the locked mode. If the service module 208 identifies the service on the white list, the service module 208 may allow the service to access communication interfaces while the device is in the locked mode, e.g., the service module 208 may not block the services access to the communication interfaces while the device is in the locked mode.

In one embodiment, the connection module 204 includes an instance of the browser module 210, which is configured to disable automatic refresh functionality of a web browser, file browser (e.g., for an FTP application, or the like), or the like that is executing on a device when the device is placed in the locked mode. Some web browsers may provide an automatic web page refresh feature that automatically refreshes a web page to update the content presented on the web page. In some instances, however, web pages may include malicious code, such as cross-site scripting ("XSS") code that allows attackers to inject client-side scripts into web pages. By preventing the automatic refresh capabilities of the web browsers, the web page will not automatically refresh, and malicious code may be prevented from being received at the device via the web browser.

In some embodiments, the browser module 210 accesses the settings of the web browsers to turn-off automatic refresh when the device is placed in the locked mode. In another embodiment, the browser module 210 access the settings of the web browsers to place the web browsers in "offline"

mode so that the browsers do not attempt to access the network interfaces of the device while the device is in the locked mode. In a further embodiment, the browser module 210 blocks network traffic from and/or to the web browsers while the device is in locked mode. For example, the browser module 210 may add the web browsers to block list on the firewall, on a router, on a network port, and/or the like.

In one embodiment, the connection module 204 includes an instance of a network module 212 that is configured to block incoming and/or outgoing network traffic that is received at the communication interfaces while the device is in the locked mode. For example, the network module 212 may disregard, ignore, intercept, queue, store, and/or the like network traffic received at a wireless or wired network port until the device is no longer in the locked mode. The network module 212, in another embodiment, creates a firewall rule, or the like, on the device, on a router, or the like, to prevent network traffic from entering and/or exiting the firewall. In this manner, the network module 212 prevents unauthorized network communications from entering and/or leaving the device while the device is in the locked mode.

In certain embodiments, the connection module 204 reverts the preventive security measures that the device module 206, the service module 208, the browser module 210, and the network module 212 implement to prevent access to the communication interfaces when the device is placed in the locked mode when the device is unlocked by an authorized user.

Figure 3:
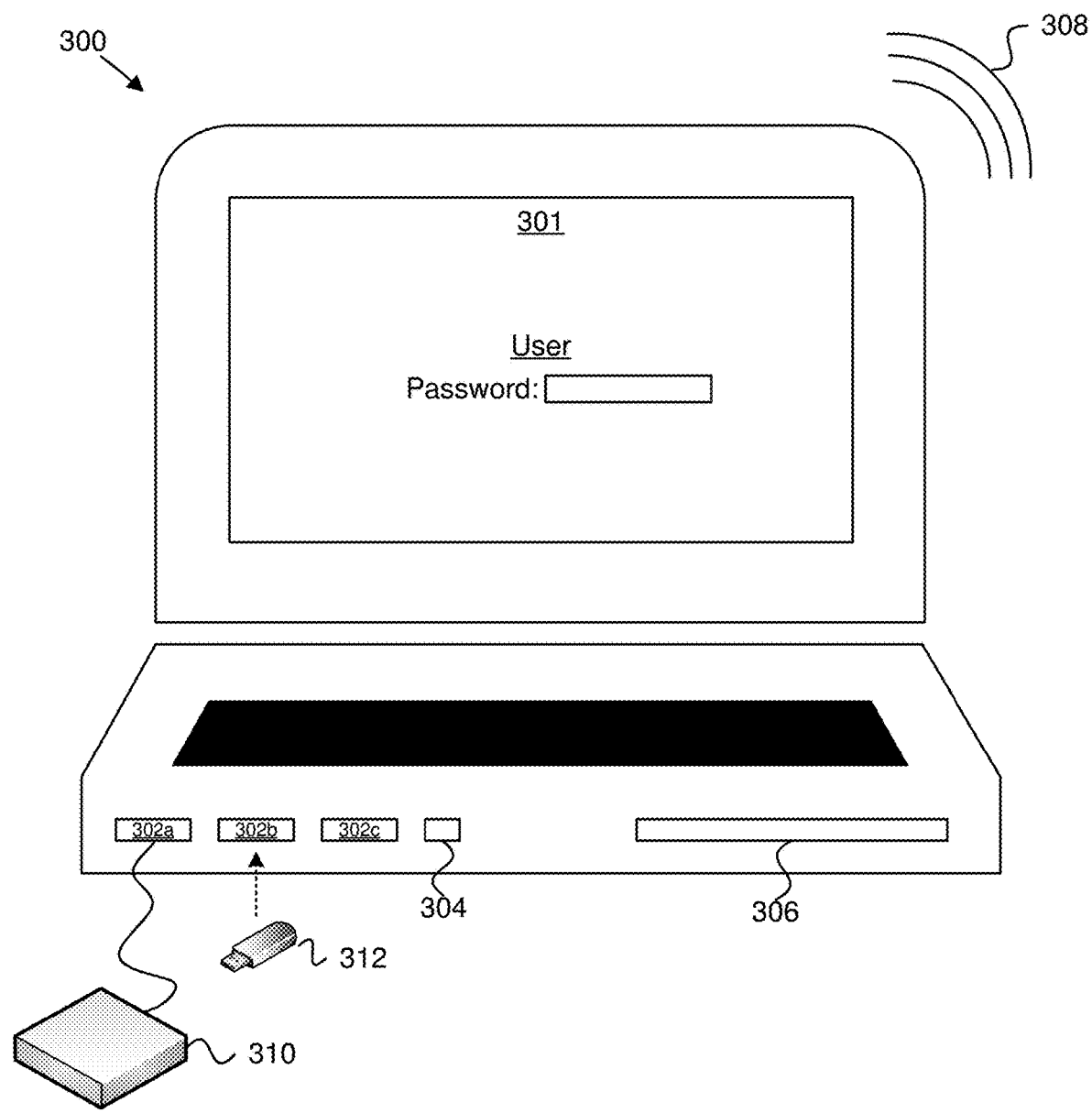
FIG. 3 is a schematic block diagram illustrating one example embodiment of a locked device in accordance with the subject matter disclosed herein.

FIG. 3 is a schematic block diagram illustrating one embodiment of a computing device 300 according to the subject matter disclosed herein. In one embodiment, the computing device 300 includes a display 301, and a plurality of communication interfaces 302-306, including USB ports 302a-c (collectively 302), an Ethernet port 304, and an optical drive 306. The computing device 300 may also include a wireless interface 308, which may include a Wi-Fi interface, a Bluetooth® interface, an NFC interface, and/or the like.

In one embodiment, the computing device 300 may be placed in a locked mode, either automatically or by a user, such that a password is required to gain access to the computing device 300. However, if the computing device 300 includes plug and play functionality, or the like, peripheral devices such as an external hard drive 310, a USB flash drive 312, a network device (not shown), a computer readable storage device placed in the optical drive 306, or the like, may be connected to the computing device 300 and allowed to communicate via the communication interfaces 302-308.

In one embodiment, the lock module 202 detects when the computing device 300 is placed in the locked mode. In response to being placed in the locked mode, the device module 206 may deactivate or disable the communication interfaces 302-308 so that peripheral devices 310, 312 cannot transmit data back and forth to and from the computing device 300 until the computing device 300 is unlocked by an authorized user.

In certain embodiments, the device module 206 allows peripheral devices 310, 312 that are connected to the computing device 300 via the communication interfaces 302-308 when the computing device 300 is placed in the locked mode to continue to communicate with the computing device 300 via the communication interface that they are connected to. In other words, the device module 206 does not disable or deactivate the communication interfaces 302-308 that the peripheral devices 310, 312 are connected to when the computing device 300 is placed in the locked mode.

For instance, assuming the external hard drive 310 is connected to the computing device 300 via a USB port 302a when the computing device 300 is placed in the locked mode, the device module 206 will not disable the USB port 302a that the external hard drive 310 is connected to when the computing device 300 is placed in the locked mode. Thus, the external hard drive 310 may be allowed to transmit and receive data to/from the computing device 300 while the computing device 300 is in the locked mode. However, if the USB flash drive 312 is inserted into a USB port 302 after the computing device 300 is placed in the locked mode, the USB flash drive will not be allowed to (e.g., will be blocked) communicate with the computing device 300 via the USB port 302 because the device module 206 disabled the USB ports 302 when the computing device 300 was placed in the locked mode.

Similarly, the network module 212 may block network traffic from being transmitted and received to/from the computing device 300 to a network device over a network connection, either wired 304 or wireless 308. In this manner, peripheral devices 310, 312 may not be allowed to send and receive data to/from the computing device 300 while the computing device 300 is in a locked mode in order to prevent unauthorized access to the computing device 300 via the communication interfaces 302-308.

Figure 4:
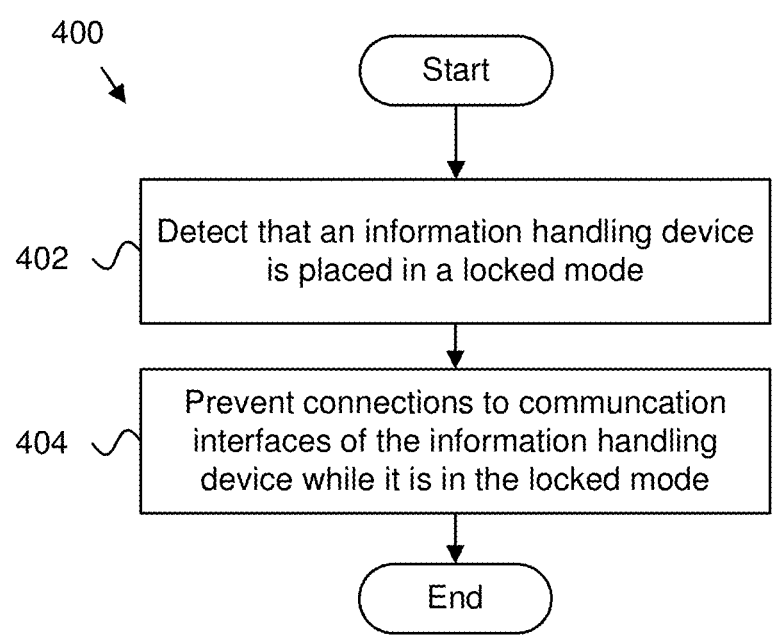
FIG. 4 is a schematic flow chart diagram illustrating one embodiment of a method for preventing connections to a locked device.

FIG. 4 is a schematic flow chart diagram illustrating one embodiment of a method 400 for preventing connections to a locked device. In one embodiment, the method 400 begins and the lock module 202 detects 402 that an information handling device 102 is placed in a locked mode. In a further embodiment, the connection module 204 prevents 404 connections to the one or more communication interfaces while the information handling device 102 is in the locked mode, and the method 400 ends.

Figure 5:
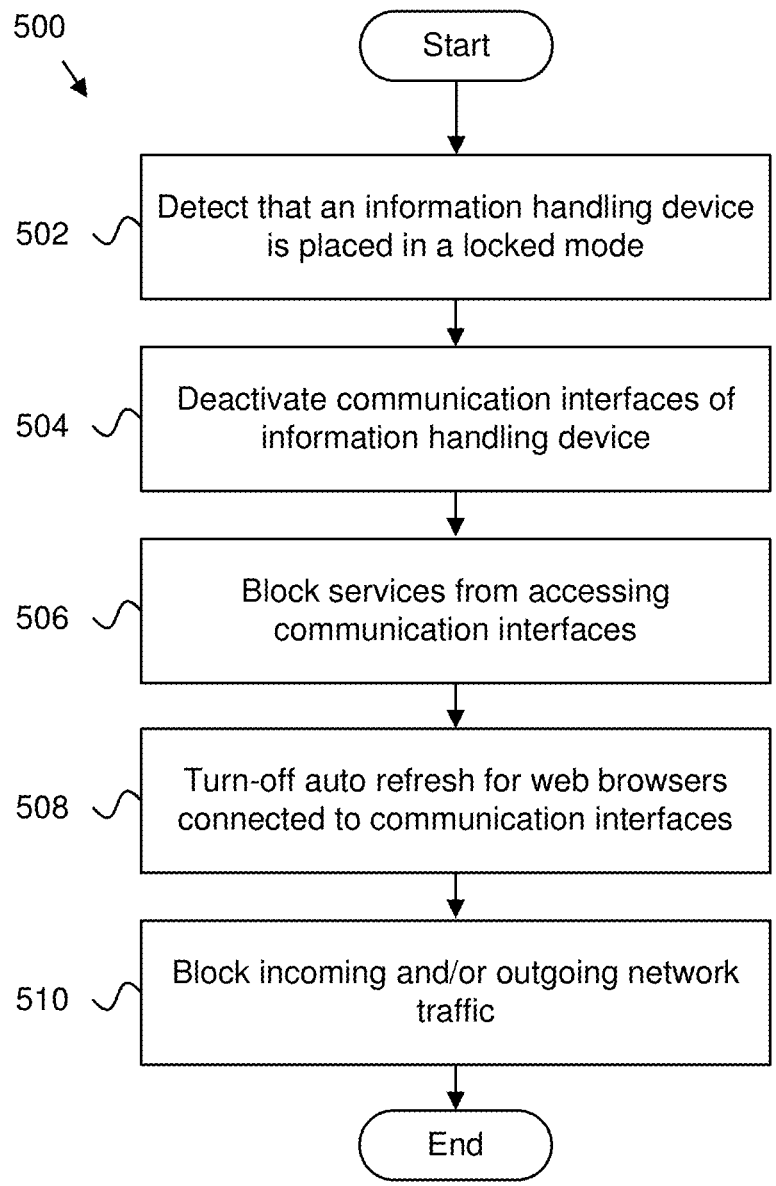
FIG. 5 is a schematic flow chart diagram illustrating one embodiment of another method for preventing connections to a locked device.

FIG. 5 is a schematic flow chart diagram illustrating one embodiment of another method 500 for preventing connections to a locked device. In one embodiment, the method 500 begins, and the lock module 202 detects 502 that an information handling device 102 is placed in a locked mode. In a further embodiment, the device module 206 deactivates 504, disables, or the like one or more communication interfaces of the information handling device 102 in response to the information handling device 102 being placed in a locked mode.

In some embodiments, the service module 208 blocks 506 or prevents services executing on the information handling device 102 from accessing the communication interfaces so that data cannot be transferred to/from the information handling device 102 via the communication interfaces by the services executing on the information handling device 102 in response to the information handling device 102 being placed in a locked mode.

In certain embodiments, the browser module 210 turns-off 508, disables, or the like an automatic refresh feature of one or more web browsers that are executing on the information handling device 102 and that have access to one or more communication interfaces, e.g., a network interface, of the information handling device 102 in response to the information handling device 102 being placed in a locked mode. In this manner, the web browser cannot receive web page updates from a web server via a network interface, and the web server cannot send data to the information handling device 102 via a communication interface that the web browser is connected to.

In a further embodiment, the network module 212 blocks 510 any incoming and/or outgoing network traffic from being sent from or received by the information handling device 102 in response to the information handling device 102 being placed in a locked mode. In this manner, any network devices that are connected to the information handling device 102 via a network interface may not be allowed to communicate with the information handing device 102, and the method 500 ends.

Figure 6:
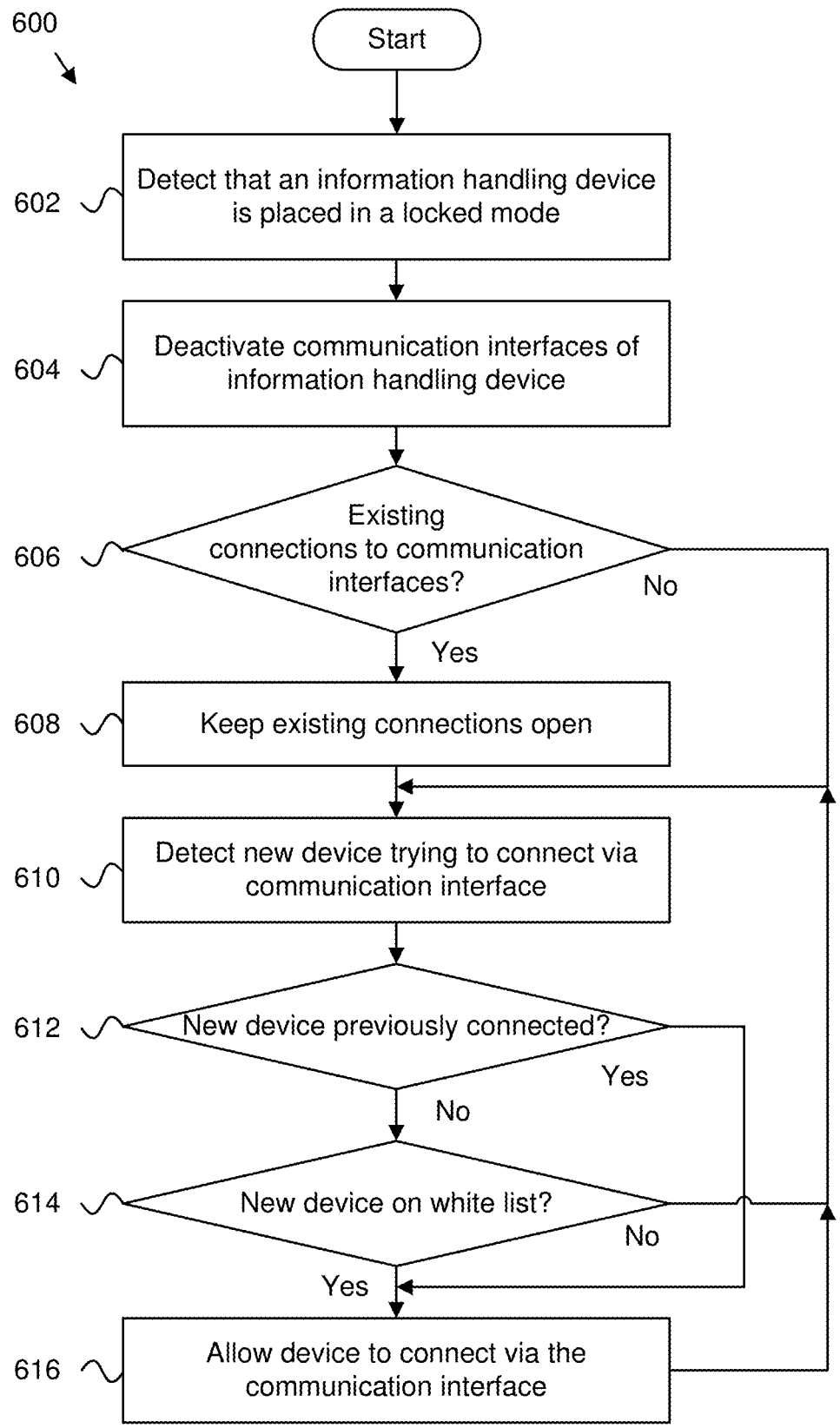
FIG. 6 is a schematic flow chart diagram illustrating one embodiment of a method for preventing connections to a locked device.

FIG. 6 is a schematic flow chart diagram illustrating one embodiment of another method 600 for preventing connections to a locked device. In one embodiment, the method 600 begins, and the lock module 202 detects 602 that an information handling device 102 is placed in a locked mode. In a further embodiment, the device module 206 deactivates 604 one or more communication interfaces of the information handling device 102 in response to the information handling device 102 being placed in the locked mode.

In certain embodiments, the device module 206 determines 606 whether there are existing connections to the communication interfaces by one or more peripheral devices when the information handling device 102 was placed in the locked mode. If so, the device module 206 may keep 608 the existing connections open by not deactivating the communication interfaces that the existing peripheral devices are connected to.

Otherwise, the device module 206 detects 610 new peripheral devices that are attempting to connect to the information handling device 102 via a communication interface. If the device module 206 detects 610 that a new peripheral device is attempting to connect to the information handling device 102 via a communication interface, the device module 206 determines 612 whether the new device was previously connected to the information handling device 102, e.g., based on matching a stored device identifier to the device identifier of the connected device. If so, the device module 206 may allow 616 the peripheral device to connect to the information handling device 102 via the communication interface that it is connected to.

Otherwise, the device module 206 determines 614 whether the new peripheral device is on a white list of allowed devices, e.g., based on matching a stored device identifier on the white list to the device identifier of the connected device. If so, the device module 206 may allow 616 the peripheral device to connect to the information handling device 102 via the communication interface that it is connected to, and the device module 206 continues to detect 610 new peripheral devices connecting to the information handling device 102.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
   one or more communication interfaces of an information handling device, the one or more communication interfaces enabling communication while the information handling device is placed in a locked mode;
   a processor operatively coupled to the one or more communication interfaces;
   a memory of the information handling device that stores code executable by the processor to:
   log identifying information for external devices that are connected to the information handling device prior to the information handling device being placed in the locked mode;
   detect that the information handling device is placed in the locked mode;
   prevent connections to the one or more communication interfaces while the information handling device is in the locked mode;
   detect an external device connect to a communication interface of the information handling device while it is in the locked mode; and
   allow a connection to the detected external device on the communication interface in response to determining that an identifier for the external device matches a logged identifier for an external device that was previously connected to the information handling device prior to the information handling device being placed it the locked mode.

2. The apparatus of claim 1, further comprising code executable by the processor to prevent connections to the one or more communication interfaces while the information handling device is in the locked mode by deactivating the one or more communication interfaces such that one or more external devices cannot communicatively connect to the information handling device via the one or more communication interfaces.

3. The apparatus of claim 2, further comprising code executable by the processor to allow new connections from the one or more external devices via the one or more communication interfaces while the information handling device is in the locked mode in response to determining that the one or more external devices have been previously connected to the information handling device via the one or more communication interfaces.

4. The apparatus of claim 2, further comprising code executable by the processor to:
   detect an external device attempting to connect to the information handling device via the one or more communication interfaces while the information handling device is in the locked mode;
   check a white list of allowed external devices; and
   allow the external device to connect to the information handling device while the information handling device is in the locked mode in response to the external device being on the white list.

5. The apparatus of claim 1, further comprising code executable by the processor to prevent connections to the one or more communication interfaces while the information handling device is in the locked mode by disabling automatic refresh functionality of one or more web browsers that are communicatively coupled to the one or more communication interfaces.

6. The apparatus of claim 5, further comprising code executable by the processor to access the settings of the one or more web browsers to disable the automatic refresh functionality.

7. The apparatus of claim 1, further comprising code executable by the processor to prevent connections to the one or more communication interfaces while the information handling device is in the locked mode by placing one or more web browsers that are communicatively coupled to the one or more communication interfaces in an offline mode.

8. The apparatus of claim 1, further comprising code executable by the processor to prevent connections to the one or more communication interfaces while the information handling device is in the locked mode by blocking one or more of incoming and outgoing network traffic received at the one or more communication interfaces.

9. The apparatus of claim 1, further comprising code executable by the processor to prevent connections to the one or more communication interfaces while the information handling device is in the locked mode by blocking one or more services from accessing the one or more communication interfaces.

10. The apparatus of claim 9, further comprising code executable by the processor to allow services that are executing at the time that the information handling device is placed in the lock mode to continue to access the one or more communication interfaces while the information handling device is in the locked mode.

11. The apparatus of claim 9, further comprising code executable by the processor to:
  detect a service attempting to access the one or more communication interfaces while the information handling device is in the locked mode;
  check a white list of allowed services; and
  allow the service to access the one or more communication interfaces while the information handling device is in the locked mode in response to the service being on the white list.

12. The apparatus of claim 1, wherein the one or more communication interfaces are selected from the group consisting of:
  a serial bus;
  a universal serial bus;
  a wired network port;
  a wireless network port; and
  an optical drive.

13. A method comprising:
  logging, by a processor, identifying information for external devices that are connected to the information handling device prior to the information handling device being placed in the locked mode;
  detecting that an information handling device is placed in a locked mode, the information handling device comprising one or more communication interfaces that enable communication while the information handling device is placed in the locked mode;
  preventing connections to the one or more communication interfaces while the information handling device is in the locked mode;
  detecting an external device connect to a communication interface of the information handling device while it is in the locked mode; and
  allowing a connection to the detected external device on the communication interface in response to determining that an identifier for the external device matches a logged identifier for an external device that was previously connected to the information handling device prior to the information handling device being placed it the locked mode.

14. The method of claim 13, further comprising preventing connections to the one or more communication interfaces while the information handling device is in the locked mode by deactivating the one or more communication interfaces such that one or more external devices cannot communicatively connect to the information handling device via the one or more communication interfaces.

15. The method of claim 14, further comprising allowing new connections from the one or more external devices via the one or more communication interfaces while the information handling device is in the locked mode in response to determining that the one or more external devices have been previously connected to the information handling device via the one or more communication interfaces.

16. The method of claim 14, further comprising:
  detecting an external device attempting to connect to the information handling device via the one or more communication interfaces while the information handling device is in the locked mode;
  checking a white list of allowed external devices; and
  allowing the external device to connect to the information handling device while the information handling device is in the locked mode in response to the external device being on the white list.

17. The method of claim 13, further comprising preventing connections to the one or more communication interfaces while the information handling device is in the locked mode by disabling automatic refresh functionality of one or more web browsers that are communicatively coupled to the one or more communication interfaces.

18. The method of claim 13, further comprising preventing connections to the one or more communication interfaces while the information handling device is in the locked mode by blocking one or more of incoming and outgoing network traffic received at the one or more communication interfaces.

19. The method of claim 13, further comprising preventing connections to the one or more communication interfaces while the information handling device is in the locked mode by blocking one or more services from accessing the one or more communication interfaces.

20. A program product comprising a non-transitory computer readable storage medium that stores code executable by a processor, the executable code comprising code to perform:
  logging identifying information for external devices that are connected to the information handling device prior to the information handling device being placed in the locked mode;
  detecting that an information handling device is placed in a locked mode, the information handling device comprising one or more communication interfaces that enable communication while the information handling device is placed in the locked mode;
  preventing connections to the one or more communication interfaces while the information handling device is in the locked mode;
  detecting an external device connect to a communication interface of the information handling device while it is in the locked mode; and
  allowing a connection to the detected external device on the communication interface in response to determining that an identifier for the external device matches a logged identifier for an external device that was previously connected to the information handling device prior to the information handling device being placed it the locked mode.

\* \* \* \* \*